Aug. 4, 1931.                B. T. WILSON                1,817,331
                         LAWN MOWER SHARPENER
                         Filed March 19, 1928

INVENTOR.
BINGHAM T. WILSON
BY
ATTORNEYS.

Patented Aug. 4, 1931

1,817,331

UNITED STATES PATENT OFFICE

BINGHAM T. WILSON, OF COVINA, CALIFORNIA

LAWN MOWER SHARPENER

Application filed March 19, 1928. Serial No. 262,731.

This invention relates to a new and novel sharpening device for lawn mowers, and comprises new and novel improvements, providing a device which is economical in its construction and efficient in its operation.

Lawn mower sharpening devices as ordinarily constructed generally comprise a complex clamping arrangement, provided with a guide and with an abrasive element.

It is one of the principal objects of my invention to produce a device of the character described, in which an ordinary file may be used as the sharpening element and also as a handle element, the file being provided with a guide clamp adapted to engage the axle of a lawn mower and with an oppositely disposed blade guiding clamp which is adapted to receive the cutting edge of the lawn mower blade and to direct the relative course of the file over the blade, in order that a uniformly beveled surface may be obtained.

Figure 1:
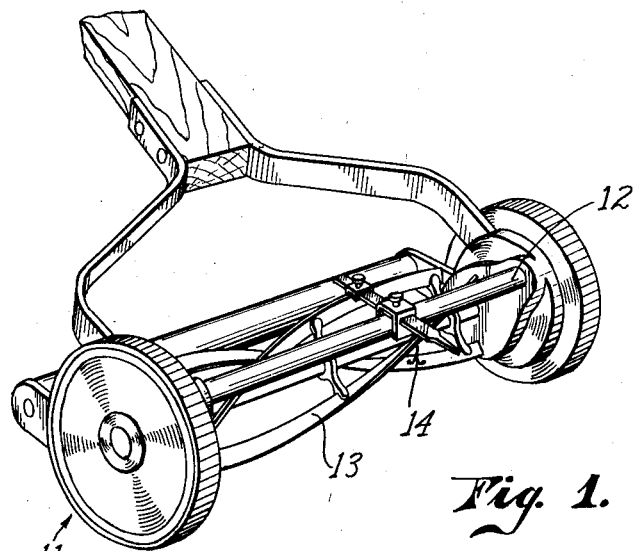

Other objects and advantages of my invention will be better understood from the following description of an illustrative embodiment thereof, as shown in the accompanying drawings, in which Fig. 1. is a perspective view of a lawn mower, illustrating the manner of using the blade sharpening device.

Figure 2:
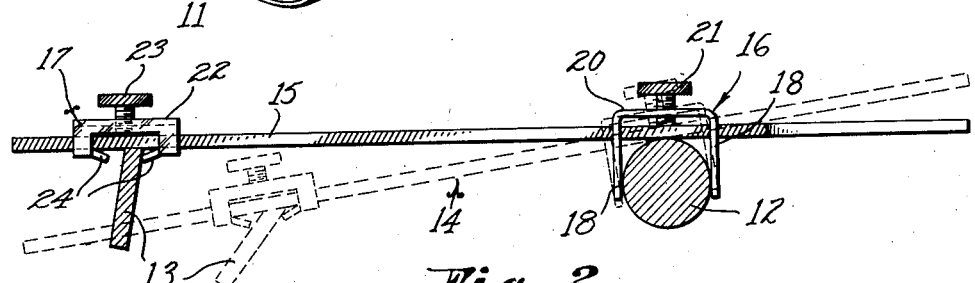
Figure 3:
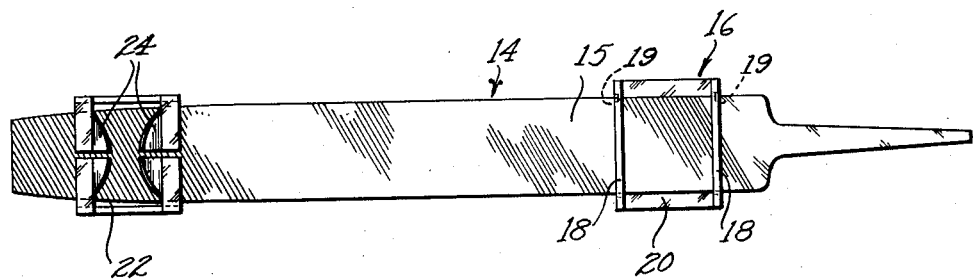

Fig. 2 is an elevational view, showing an embodiment of my invention engaging a lawn mower axle and a lawn mower blade, and Fig. 3 is an inverted plan view.

More particularly describing my invention, as herein illustrated, reference numeral 11 indicates a lawn mower which has an axle indicated at 12 and cutting blades indicated at 13. Reference numeral 14 indicates a lawn mower sharpening device which comprises a sharpening element in the form of an ordinary file indicated at 15, which, as hereinabove indicated, constitutes handle means and supporting means for an axle engaging guide clamp 16 and a blade guide 17. The axle engaging guide clamp 16 comprises downwardly extending legs 18, which are provided with oppositely disposed file receiving apertures 19 and an upper plate member 20 thereon is adapted to receive a threaded screw 21, by means of which the clamp may be adjusted to any desired position upon the file. The blade guide 17 is adapted to substantially surround the file 15, and the top plate 22 thereof receives the threaded adjusting screw 23, by means of which this element may be adjusted to any desired position upon the file. The lower surface of the blade guide 17 is provided with oppositely disposed curved and downwardly extending guide plates 24, by means of which the blade 13 is held in constant engagement with the file 15.

It will be understood that the blade of the lawn mower, being curved, the lateral advancement of the file over the axle 12 during the engagement thereof with the blade 15, will cause a radial movement of the blades, necessitating the oppositely disposed curved surfaces indicated at 24, and it will be further understood from the dotted line position of the sharpener 14 and the blade 13 shown in Fig. 2, that the adjustment of the clamp 17 upon the file 15 may be employed to obtain any desired bevel upon the cutting edge 24 of the blade.

It will be readily apparent from the accompanying illustrations that the clamps may be inserted on the file and that they may be used "end for end", thus making the entire cutting surface of the file available as a sharpener abrasive for the lawn mower blade, and since the clamps may be constructed of comparatively cheap material, this invention comprises a lawn mower sharpener which is highly efficient in its operation and very economical in its construction.

While I have herein illustrated a single embodiment of my invention, it is to be understood that it is not limited to the precise construction set forth, but includes within its scope whatever changes fairly come within either the terms or spirit of the appended claims.

I claim as my invention:

1. A sharpening device for lawn mowers comprising the combination of: a sharpening element; a guide member adjustably mounted on said sharpening element and adapted to slidably engage the axle of a lawn mower; and a blade guide mounted on said sharpening element oppositely to said first mentioned guide member.

2. A sharpening device for lawn mowers comprising the combination of: a sharpening element; a guide member adjustably mounted on said sharpening element and adapted to slidably engage the axle of a lawn mower; and a blade guide mounted on said sharpening element oppositely to said first mentioned guide member, said sharpening element comprising the sole connection between said guide members.

3. A sharpening device for lawn mowers comprising the combination of: a file; a guide clamp adjustably mounted on said file and adapted to slidably engage the axle of a lawn mower; and a blade guide adjustably mounted on said file, oppositely to said guide clamp.

4. A sharpening device for lawn mowers comprising the combination of: a file; a guide clamp adjustably mounted on said file and adapted to slidably engage the axle of a lawn mower; and a blade guide adjustably mounted on said file, oppositely to said guide clamp and provided with means for engaging said blade for imparting radial movement thereto during a lateral movement of said sharpening device thereover.

5. A sharpening device for lawn mowers comprising the combination of: a file; an axle engaging guide provided with file receiving apertures and a file engaging adjustment screw; and a blade guide provided with file receiving apertures, an adjustment screw, and oppositely disposed curved guide faces for holding the edge of a lawn mower blade in contact with a fixed section of said file, said file comprising the sole connecting means between said axle engaging guide and said blade guide.

In testimony whereof, I have hereunto set my hand at Los Angeles, California, this 12th day of March, 1928.

BINGHAM T. WILSON.